May 27, 1941.　　　　　D. FRANKS　　　　　2,243,797
MACHINE FOR SEPARATING SEEDS OR THE LIKE
Filed Jan. 16, 1939　　　3 Sheets-Sheet 1
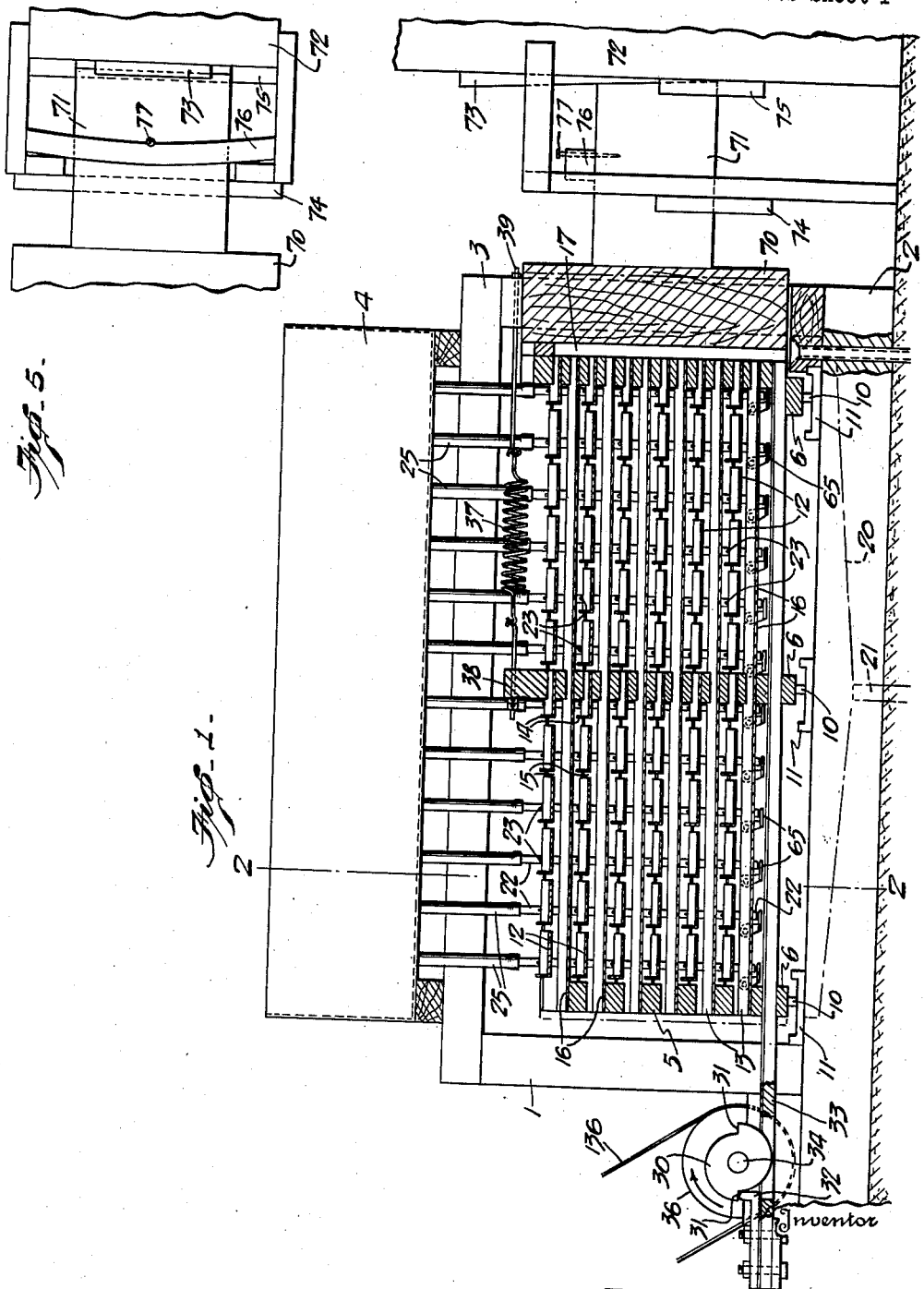
Inventor
DAVID FRANKS
By
Attorneys

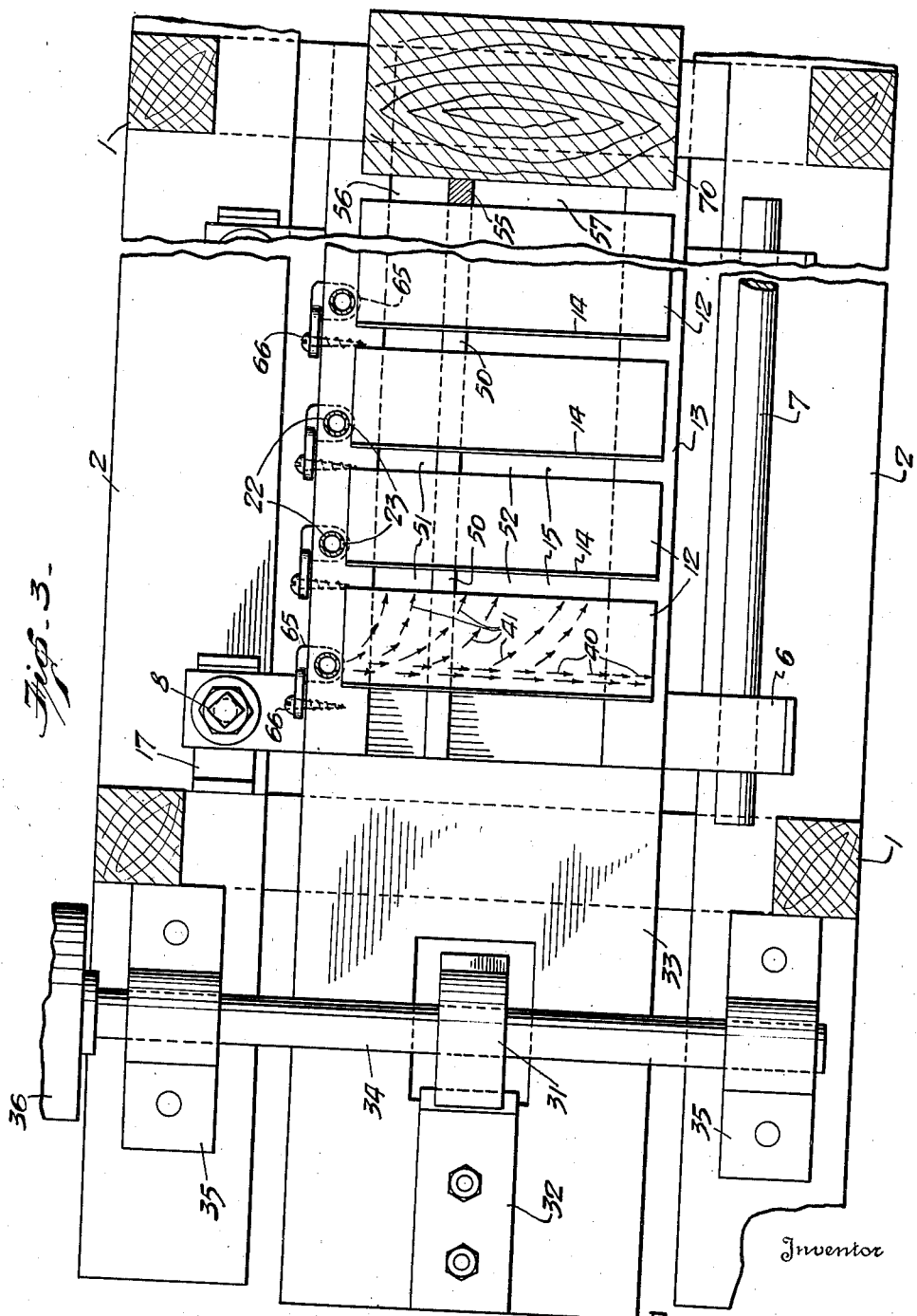

Patented May 27, 1941

2,243,797

UNITED STATES PATENT OFFICE 2,243,797

MACHINE FOR SEPARATING SEEDS OR THE LIKE

David Franks, Millersburg, Ohio, assignor of one-third to Charles K. Franks and one-third to Samuel Franks, Jr., both of Millersburg, Ohio Application January 16, 1939, Serial No. 251,232

5 Claims. (Cl. 209—480)

The present invention relates to improvements in machines for separating seeds, and it provides certain improvements upon the machine shown and described in my prior Patent No. 1,686,374 granted October 2, 1928.

One of the primary objects of the present invention is to provide means for further dividing the seeds than is possible with a machine as shown and described in said patent, it enabling the residue, composed mostly, for example, of weed seeds, obtained from the separation of the most valuable seeds from the less valuable or weed seeds, to be divided into a portion containing some of the valuable seeds and another portion which does not contain any substantial amount of valuable seeds or is composed almost altogether of weed seeds and is practically of no value.

Another object is to provide simple and effective means for preventing clogging of the tubes employed in machines of the kind referred to for supplying the seeds to the tiers of plates on which the seeds are separated, thereby insuring continuous and efficient operation of all of the tiers of separating plates and hence operation of the machine up to its full capacity.

Another object of the invention is to provide improved means for absorbing the impact produced during the reciprocation of the carrier of a seed separating machine of the kind referred to whereby the frame of the machine is relieved of the stress of the impact, and to provide simple and effective means for regulating the degree of the impact.

To these and other ends, the present invention consists in certain improvements and combinations and arrangements of parts all as will be hereinafter more fully described, the features of novelty being pointed out more particularly in the claims at the end of this specification.

In the accompanying drawings:

Fig. 1 is a vertical longitudinal section, partly in elevation, of a seed separating machine embodying the present invention;

Fig. 2 is a transverse vertical section taken on the line 2—2 in Fig. 1;

Fig. 3 is a horizontal section, on an enlarged scale and partly broken away, showing some of the seed separating plates and the seed feeding means therefor, and the mechanism for reciprocating the carrier;

Fig. 4 is a detail section taken on the line 4—4 in Fig. 2; and

Fig. 5 is a fragmentary top plan view of the abutment block and its supporting and adjusting means.

Similar parts are designated by the same reference characters in the several figures.

The machine shown, excepting the improvements provided by the present invention, is like that shown and described in my prior patent hereinbefore referred to and to which reference may be had for a detailed description. For the purposes of the present invention, the machine may be described briefly as comprising a stationary main frame 1 having a base 2 adapted to rest on a floor or other stationary support and an upper structure 3 adapted to support a seed bin or hopper 4 from which the seeds are fed to the separating devices in the machine, and within the main frame is mounted a reciprocatory carrier 5 which carries the seed separating devices. The carrier 5 comprises a frame the transverse base members 6 of which are supported at one of the longitudinal sides of the carrier by a shaft 7 which extends longitudinally of and is supported on the main frame, the base members 6 being slidable on said shaft, and the other ends of the base members are supported by screws 8 which are threaded in bushings 9 in the base members and rest slidably at their lower ends 10 upon track members 11, adjustment of the screws 8 tilting the carrier laterally, more or less, as may be desirable or necessary to effect the separation of the seeds. The support of the carrier on the shaft 7 and screws 8 enables the carrier to be reciprocated longitudinally in the main frame.

The seed separating devices in the carrier comprise a plurality of tiers of separating plates 12. The separating plates of each tier are arranged in a series disposed longitudinally in the carrier and supported by longitudinally extending rails 13 which are fixed in the carrier and constitute part of the framework thereof. Each of the seed separating plates is flat and has a flange 14 turned upwardly along one of its edges, and these plates are secured on the longitudinal rails 13 at longitudinally spaced intervals, thus providing seed discharge openings 15 between adjacent plates. A floor 16 is secured to the under sides of the rails 13 beneath each series of separating plates, these floors extending longitudinally throughout the length of the series of separating plates and closing the bottom of the space between the respective pairs of rails 13, these floors being adapted to receive the residue of the seeds separated on the respective series of separating plates above it and which discharge onto the floor through the openings 15, and to convey such seeds longitudinally of the carrier to a residue seed discharge 17 at one end thereof In order to facilitate the separation of the good seeds from the residue seeds, the carrier is inclined longitudinally, as shown in Fig. 1, so that the surfaces of the plates 12 and floors 16 slope upwardly toward the discharge 17, the seeds being advanced upwardly on these surfaces by the sudden arresting of the reciprocatory movements of the carrier hereinafter described. The lateral tilt or inclination of the carrier, produced by appropriate adjustment of the screws 8, causes the seeds to gravitate laterally over the separating plates, the good or valuable seeds separated from the residue discharging from the lower ends of the separating plates at one side of the carrier and dropping into a hopper 20 from which they are discharged through a pipe 21 to a suitable point for packing or storage. The seeds are fed to the tiers of separating plates by tubes 22 which extend from top to bottom of the carrier, one of these tubes being provided for each tier of superposed separating plates and having seed discharge openings 23 in the inner side thereof immediately above the levels of the adjacent ends of the separating plates so that the seeds will be discharged from these openings onto the ends of the respective separating plates, these ends of the separating plates being higher than their other ends, so that the seeds thus fed to the separating plates will gravitate thereover toward their other or lower ends. The seeds are supplied to the tubes 22 from the bin or hopper 4 through flexible tubes 25 which do not interfere with reciprocatory movement of the carrier.

The carrier is reciprocated, during the operation of the machine, by a cam 30 which is of a double spiral form providing drops 31 therein, this cam cooperating with a plate 32 which is firmly bolted or otherwise fixed to an extension 33 attached to or forming part of the frame of the reciprocatory carrier. The cam 30 is mounted on a shaft 34 fitted in bearings 35 fixed to the main frame, the shaft 34 being rotated during the operation of the machine by any suitable means as for example by a belt pulley 36 fixed thereon and driven by a belt 136 from any suitable source of power. The action of the cam 30, during its rotation, is to draw the carrier toward the left or into the dotted line position shown in Fig. 1 until one or the other of the drops 31 in the cam reaches the plate 32. The carrier is drawn in the opposite direction or against the action of the cam 30 by a tension spring 37 one end of which is attached to an intermediate member 38 of the frame of the carrier and the other end of which is attached to the main frame of the machine as by a rod 39. The cam acting on the plate 32 moves the carrier in one direction against the action of the spring 37 until one of the drops 31 reaches the plate 32 whereupon the plate 32 is released by the cam and the spring 37 then moves the carrier in the opposite direction. During these reciprocations of the carrier, the base members 6 thereof slide on the shaft 7 and the screws 8 slide on the bearing blocks 11.

The operation of the machine as thus far described is as follows: The seeds fed from the openings 23 in the sides of the tubes 22 pass onto the separating plates 12 the upper surfaces of which slope both longitudinally and transversely of the carrier, and the sudden arresting of the reciprocations of the carrier causes the weed seeds to be propelled upwardly on the separating plates and thus separated from the good or valuable seeds, such for example as timothy, the latter gravitating across the plates in paths as indicated substantially by the arrows 40, and the residue seeds which are of less value or are practically of no value, composed of or containing for example weed seeds, travelling over the separating plates in paths indicated substantially by the arrows 41 and discharging through the openings 15.

It has been found however that a portion of the residue seeds discharging through the openings 15 and which have been heretofore discarded as waste or of no practical value, contain a substantial percentage of the good or valuable seeds whereas another portion of the residue is composed almost entirely of weed seeds or seeds of no practical value, and one of the improvements according to the present invention provides means for separating the residue seeds into those which are valuable and those which are of no substantial value. This improvement consists in providing a partition 50 which extends longitudinally along the upper side of each of the floors 16 and which subdivides the space between each floor and the series of separating plates above it into two compartments or passageways 51 and 52. Each of the partitions 50 thus divides the discharge opening 15 for the residue seeds from each separating plate into two portions corresponding with the passageways 51 and 52 so that a portion of the residue seeds, such for example as weed seeds or weed seeds containing very few of the good or valuable seeds will first discharge from the separating plate into the passageway 51 while the rest of the residue seeds containing a substantial amount of good or valuable seeds mixed with weed seeds and which travel further along the separating plate, will discharge into the passageway 52, the partition 50 providing separating means for these different grades of the residue seeds. The seed discharge 17, according to the present invention, is also provided with a vertical partition 55 which is a continuation of the partition 50, it dividing the vertical seed discharge 17 into separate passageways 56 and 57 to receive the different grades of residue seeds discharging from the passageways 51 and 52. The residue seeds from the vertical discharge passageway 57 are received in a hopper 58 from which they may be conducted to a point for packing or storage by a pipe 59, and the residue seeds from the vertical discharge passageway 56 are received in a hopper 60 from which they may be conducted to a suitable point of disposal by a pipe 61. The good or valuable seeds which travel over the separating plates along the paths 40 discharge from the lower side of the carrier and are received in the hopper 20. This improvement provided by the present invention thus enables the good or valuable seeds to be separated and collected as before but it also enables the residue seeds to be further separated according to the amount of valuable seeds contained therein and the more valuable portion of the residue seeds to be separated and recovered from the substantially valueless portion of the residue seeds.

Another improvement provided according to the present invention overcomes a tendency to clogging of the seeds in the feed tubes 22. According to this improvement, the lower ends of the seed feeding tubes 22 are open and are partially closed by shutters 65, these shutters, one for each feed tube, being pivoted on one of the rails 13 of the carrier by screws 66 which enable the shutters to be set adjustably at the proper distance from the lower open ends of the respective tubes to permit a small but continuous discharge of seeds from the lower ends of the tubes, and the screws when tightened will secure the shutters in proper adjusted positions. The small but continuous discharge of seeds from the lower ends of the feed tubes 22, thus provided by these shutters, keeps the seeds in continuous motion as they gravitate downwardly in these tubes and thus overcomes tendency of the seeds to bridge or otherwise clog at the seed discharge openings 23 in the sides of these tubes. The seeds discharged from the lower ends of the tubes 22 drop into an elongated hopper 67 from which they discharge through a pipe 68 to a point where they may mix with the seeds being supplied to the machine by an elevator or other suitable means.

Another improvement provided according to the present invention relieves the main frame of the machine from the stress of impacts produced incident to the reciprocation of the carrier. According to the present invention, each time a drop 31 in the cam 30 releases the plate 32 and the carrier is moved toward the right for example in Fig. 1, such movement of the carrier is arrested suddenly by the impact of an end member 70 of the carrier with an abutment block 71. This abutment block merely rests slidably toward one end on a frame member 74 supported on the main frame of the machine, the impacts of the carrier against this block however being sustained separately and independently of the main frame by a post 72 which is mounted rigidly in a fixed position on the floor or the like separately and independently of the main frame of the machine so that the impacts produced by the end member 70 of the carrier against the abutment block 71 will not be imposed upon the frame of the machine so that disintegration thereof is avoided. The abutment block 71 is preferably located in such a position relatively to the carrier as to be engaged by the end member 70 of the carrier when the carrier reaches its highest velocity of movement under the action of the spring 37 and before the plate 32 can engage the bottom of the drop 31 in the cam, no impact being transmitted to the main frame by the dropping of the plate 32 from the raised portion of the cam. To enable this adjustment of the abutment block to be obtained in a simple and effective manner, an end of the block 71 is supported slidably in a yoke 75 secured to the post 72, and a vertically adjustable wedge 73 is interposed between the abutment block and the post 72, it being understood that vertical adjustment of this wedge will enable the abutment block to be positioned properly in relation to the carrier to sustain the impact entirely and independently of the cam which is thus rendered free of the impact. The block 71 is held yieldingly against the wedge 73 and the latter is thereby held in its adjusted position by a cross-member 76 of wood or other suitable flexible material which is sprung into position between the uprights of the frame member 74 and a pin or spike 77 which may be driven into the block 71, the upper portion of the frame member 74 being attached to the post 72 to support it against the reaction of the flexed cross-member 76. After the movement of the carrier under the action of the spring 37 has been interrupted abruptly by the abutment block, further rotation of the cam 30 causes it to engage the plate 32 and thereby reciprocate the carrier in the opposite direction. Such reciprocation of the carrier, which continues during the operation of the machine, effects the separation of the seeds on the separating plates.

I claim as my invention:

1. In a seed separating machine, the combination of a reciprocating carrier having a plurality of superposed tiers of separator plates fixed therein, a series of upright seed supplying tubes mounted in the carrier and having openings in the sides thereof immediately above the respective separator plates for feeding seeds thereto and having leak openings at their lower ends below the openings in the sides thereof, means for supplying seeds to the upper ends of said tubes, and regulatable means for controlling the discharge of seeds from the leak openings at the lower ends of said tubes to prevent clogging of the seeds therein.

2. In a seed separating machine, the combination of a reciprocating carrier having a plurality of superposed tiers of separator plates fixed therein, a series of upright seed supplying tubes mounted in the carrier and having openings in the sides thereof immediately above the respective separator plates for feeding seeds thereto and having leak openings at their lower ends below the separator plates, means for supplying seeds to the upper ends of said tubes, and shutters individually pivoted adjacent to the lower ends of said tubes and adjustable to regulate the discharge of seeds from the leak openings of the tubes to prevent clogging of the seeds therein.

3. In a seed classifier, a carrier mounted for longitudinal reciprocation and supporting a series of transversely disposed separator plates, said plates having upwardly facing seed supporting surfaces and being spaced apart longitudinally to provide discharge openings between their edges, each of said plates also having a transversely disposed upright seed propelling wall at one edge thereof, said plates each being inclined laterally with respect to the carrier to provide a high end and a low end, means for feeding seeds to the high ends of said plates, means for reciprocating said carrier for causing said upright walls to propel said seeds over said plates and cause one class of seeds to discharge over the low ends of said plates, and for causing a second class of seeds to gravitate over the other edges of said plates through said discharge openings, each of said plates also being inclined upwardly from said one edge to said other edge, to facilitate separation, a longitudinally extending floor on said carrier disposed below said discharge openings and cooperating with said plates to define a discharge passage leading to a seed collecting conduit, and means for separating said second class of seeds into two sub-classes as they gravitate through said discharge openings, comprising a longitudinally disposed partition mounted on said floor intermediate the lateral ends of said plates and dividing each of said discharge openings and said discharge passage into two laterally separated parts.

4. The seed classified defined in claim 3, wherein said partition bridges the space between said floor and said plates and cooperates with a second partition which divides said seed collecting conduit into two parts.

5. The seed classifier defined in claim 3, wherein said partition is disposed off-center with respect to the longitudinal center line of said plates, for dividing said second class of seed into unequal subclasses.

DAVID FRANKS.